United States Patent
Balraj et al.

(10) Patent No.: US 8,989,322 B2
(45) Date of Patent: *Mar. 24, 2015

(54) DATA DETECTION AND RECEIVER CIRCUIT

(75) Inventors: Rajarajan Balraj, Duesseldorf (DE); Biljana Badic, Duesseldorf (DE)

(73) Assignee: Intel Mobile Communications GmbH, Neubiberg (DE)

( * ) Notice: Subject to any disclaimer, the term of this patent is extended or adjusted under 35 U.S.C. 154(b) by 3 days.

This patent is subject to a terminal disclaimer.

(21) Appl. No.: 13/396,898

(22) Filed: Feb. 15, 2012

(65) Prior Publication Data

US 2013/0208766 A1   Aug. 15, 2013

(51) Int. Cl.
| | |
|---|---|
| H03D 1/04 | (2006.01) |
| H03D 1/06 | (2006.01) |
| H03K 5/01 | (2006.01) |
| H03K 6/04 | (2006.01) |
| H04B 1/10 | (2006.01) |
| H04L 25/08 | (2006.01) |
| H04L 1/00 | (2006.01) |
| H04L 25/03 | (2006.01) |
| H04L 27/00 | (2006.01) |
| H04L 27/38 | (2006.01) |

(52) U.S. Cl.
CPC .... *H04L 1/00* (2013.01); *H04L 25/03* (2013.01); *H04L 27/0012* (2013.01); *H04L 27/38* (2013.01)
USPC ........................................................ 375/346

(58) Field of Classification Search
USPC ........................................................ 375/346
See application file for complete search history.

(56) References Cited

U.S. PATENT DOCUMENTS

| | | |
|---|---|---|
| 2006/0171483 A1* | 8/2006 | Jia et al. ................. 375/267 |
| 2009/0274074 A1 | 11/2009 | Astely |
| 2010/0254476 A1 | 10/2010 | Li et al. |
| 2012/0051468 A1 | 3/2012 | Weitkemper et al. |

OTHER PUBLICATIONS

Office Action dated Feb. 8, 2013 for U.S. Appl. No. 13/396,829.
3GPP TS 36.201, V8.3.0 (Mar. 2009), Release 8.
3GPP TSG-RAN WG4 #AdHoc1, Sophia Antipolis, France, Jan. 18-22, 2010, p. 1-7.
Jonathan Duplicy, et al., "MU-MIMO in LTE Systems", EURASIP Journal on Wireless Communications and Networks, vol. 2011, Article ID 496763, 13 Pages.
EUSIPCO 2011, 19th European Signal Processing Conference, Aug. 29-Sep. 2, 2011, Barcelona, Spain, p. 1-2.
Final Office Action dated Sep. 6, 2013 for U.S. Appl. No. 13/396,829.
U.S. Appl. No. 13/396,829, filed Feb. 15, 2012.
Office Action Dated Apr. 11, 2014 U.S. Appl. No. 13/396,829.
Notice of Allowance dated Sep. 30, 2014 for U.S. Appl. No. 13/396,829.

* cited by examiner

*Primary Examiner* — Tanmay Shah
(74) *Attorney, Agent, or Firm* — Eschweiler & Associates, LLC

(57) ABSTRACT

A method includes a first step of receiving a signal at a first receiver circuit on the basis of a mobile communications standard supporting multiple predefined modulation alphabets wherein the received signal includes first data dedicated to the first receiver circuit and second data dedicated to a second, different receiver circuit, a second step of determining a modulation alphabet of the multiple predefined modulation alphabets during an operation of the first receiver circuit and a third step of detecting data depending on the second data at the first receiver circuit on the basis of the determined modulation alphabet.

24 Claims, 7 Drawing Sheets

+ QPSK actual modulation
o 16 QAM predefined constant modulation

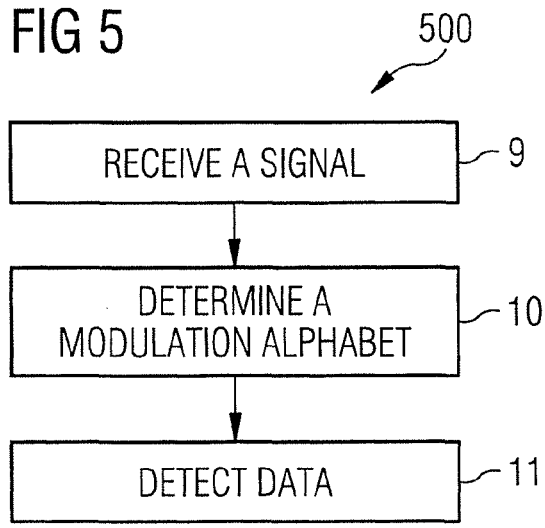
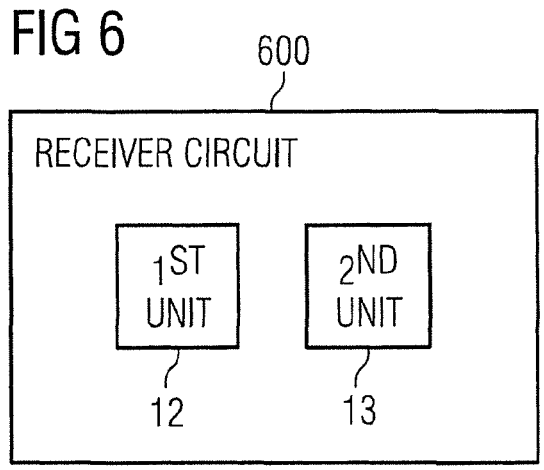
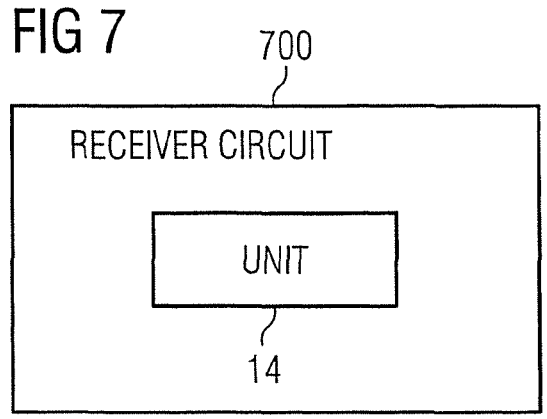

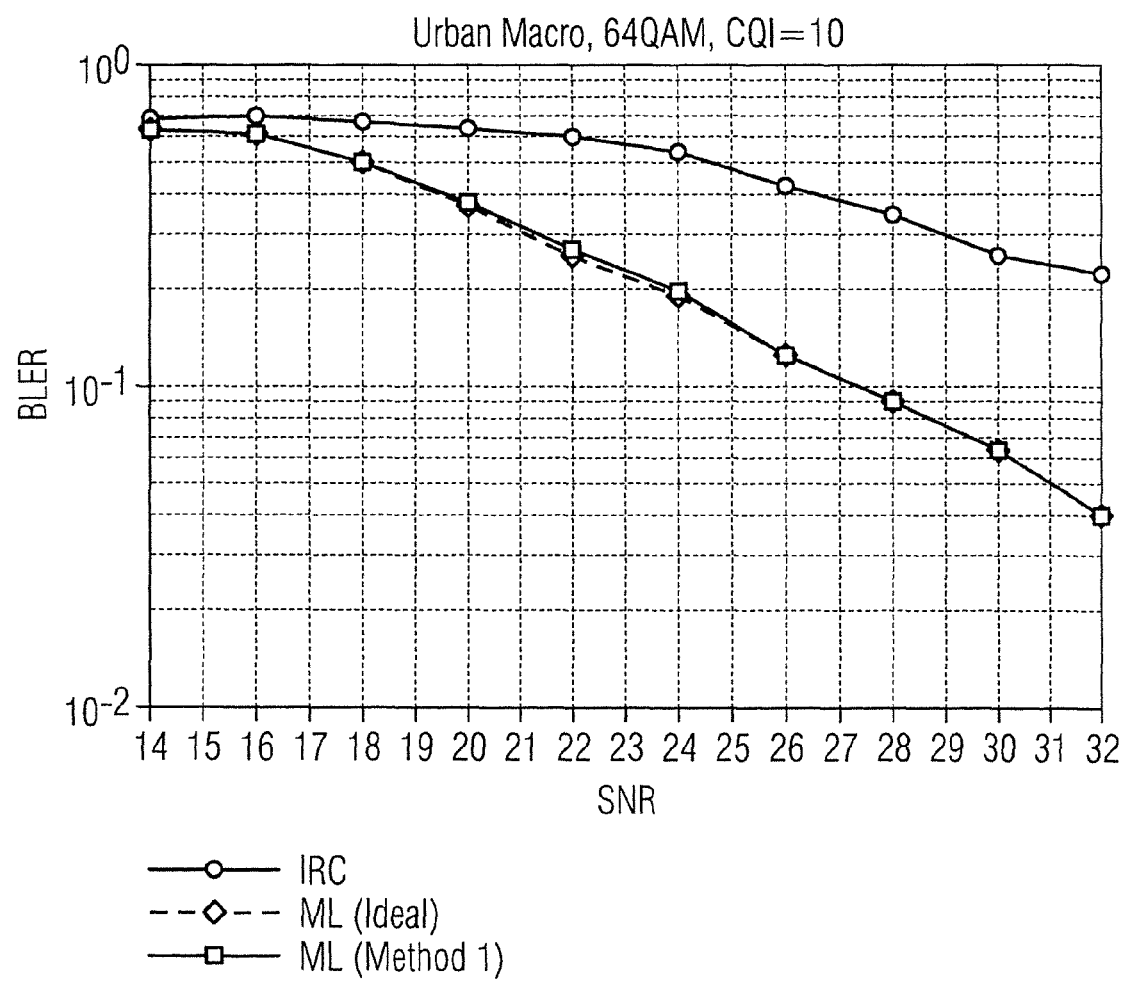

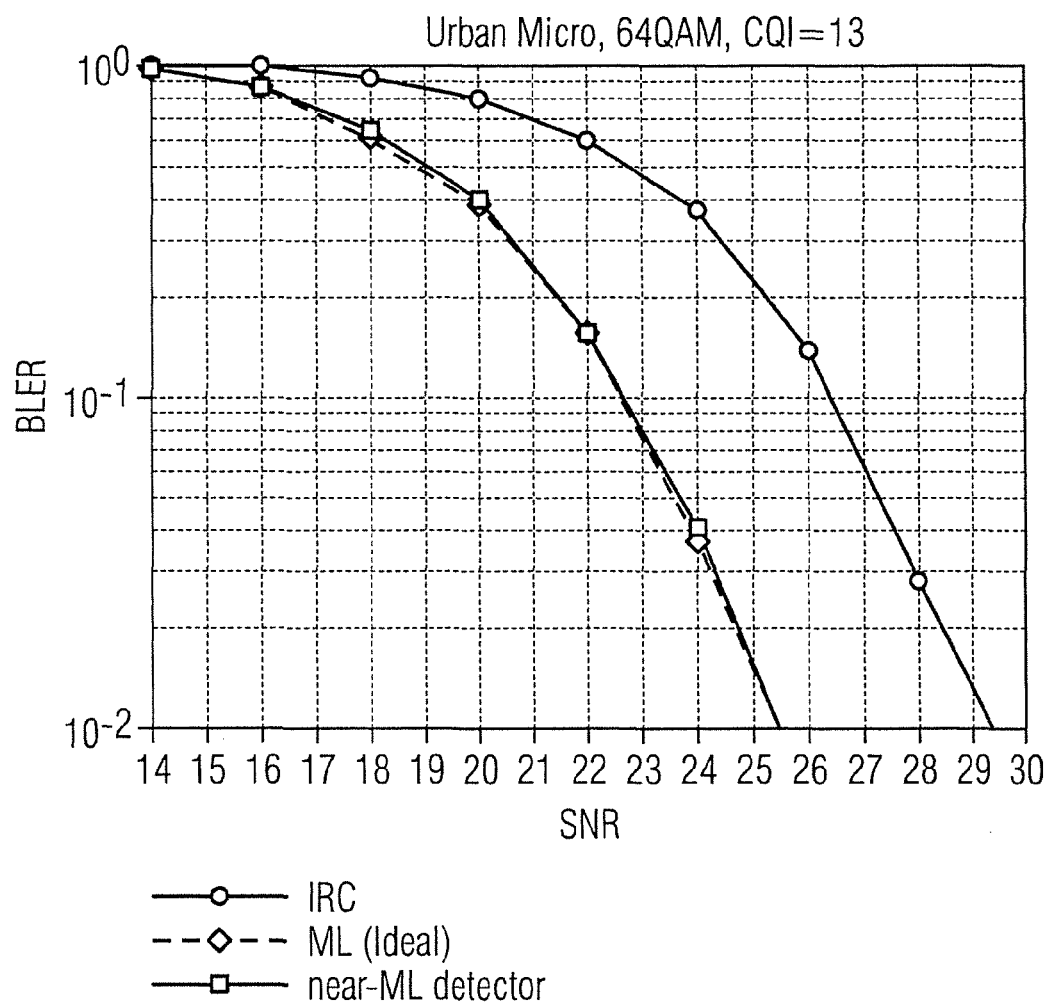

DATA DETECTION AND RECEIVER CIRCUIT

FIELD

The invention relates to mobile communications and more particular to methods for detecting data and receiver circuits for performing such methods.

BACKGROUND

In radio communications systems multiple User Equipments (UEs) may share the same frequency and time resource such that mutual interferences may occur. Methods for data detection performed in receiver circuits constantly have to be improved. In particular, it may be desirable to improve a reception quality and a performance of receiver circuits performing a data detection.

BRIEF DESCRIPTION OF THE DRAWINGS

The accompanying drawings are included to provide a further understanding of embodiments and are incorporated in and constitute a part of this description. The drawings illustrate embodiments and together with the description serve to explain principles of embodiments. Other embodiments and many of the intended advantages of embodiments will be readily appreciated as they become better understood by reference to the following detailed description.

FIG. 5 schematically illustrates a method 500.

FIG. 6 schematically illustrates a receiver circuit 600.

FIG. 7 schematically illustrates a receiver circuit 700.

FIGS. 8A to 8D schematically illustrate performances of receiver circuits.

DETAILED DESCRIPTION

Figure 1:
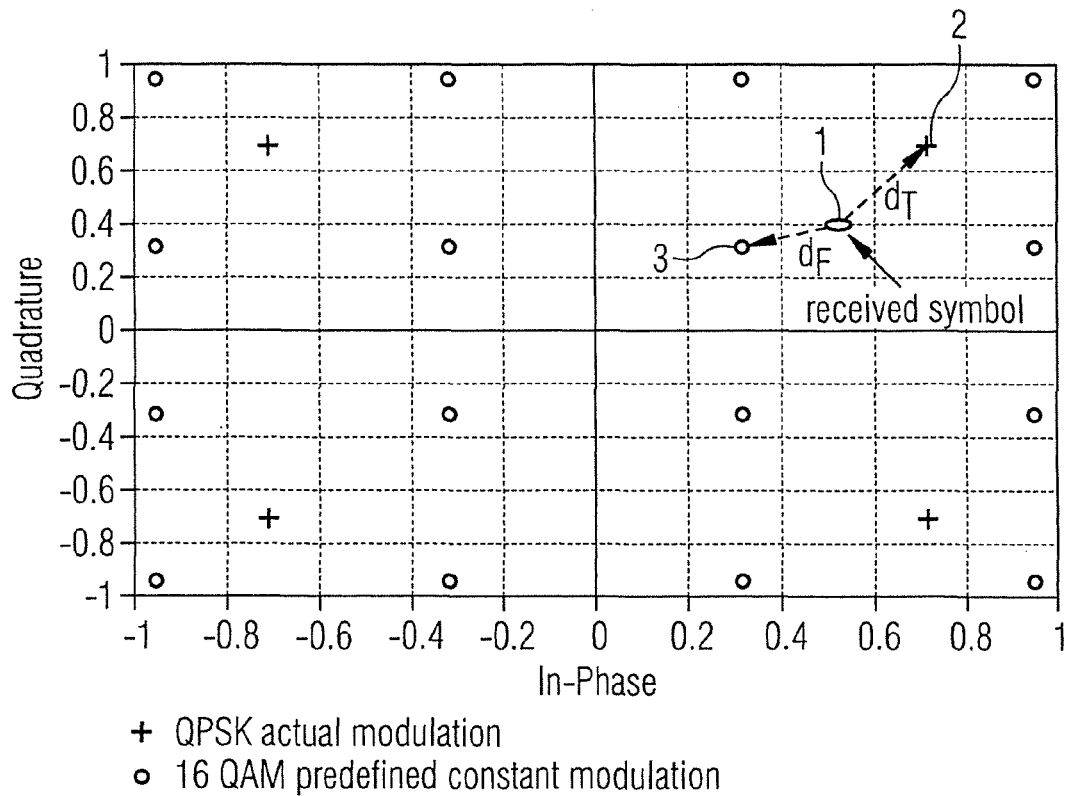
FIG. 1 schematically illustrates a detection of a data symbol.

In the following, embodiments are described with reference to the drawings wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense, and the scope of protection is defined by the appended claims.

The various aspects summarized may be embodied in various forms. The following description shows by way of illustration various combinations and configurations in which the aspects may be practiced. It is understood that the described aspects and/or embodiments are merely examples and that other aspects and/or embodiments may be utilized and structural and functional modifications may be made without departing from the scope of the present disclosure. In addition, while a particular feature or aspect of an embodiment may be disclosed with respect to only one of several implementations, such feature or aspect may be combined with one or more other features or aspects of the other implementations as it may be desired and advantageous for any given or particular application. Further, to the extent that the terms "include", "have", "with" or other variants thereof are used in either the detailed description or the claims, such terms are intended to be inclusive in a manner similar to the term "comprise". Also, the term "exemplary" is merely meant as an example, rather than the best or optimal.

In the following, various methods and receiver circuits are described separately or with reference to each other. It is understood that comments made in connection with a described method may also hold true for a corresponding receiver circuit configured to perform the method and vice versa. For example, if a specific method step is described, a corresponding receiver circuit may include a unit to perform the described method step, even if such a unit is not explicitly described or illustrated in the figures.

The methods and receiver circuits described herein may be based on or may support arbitrary (in particular digital) modulation schemes for modulating data. For example, a detected data signal may be modulated according to a Quadrature Amplitude Modulation (QAM) modulation scheme, a Binary Phase Shift Keying (BPSK) modulation scheme, a Quadrature Phase Shift Keying (QPSK) modulation scheme, a 8-QAM modulation scheme, a 16-QAM modulation scheme, a 64-QAM modulation scheme or any other suitable modulation scheme. In this specification, such known modulation schemes may also be referred to as "predefined" modulation schemes. In the following, the terms "modulation alphabet" and "modulation symbol" may be used wherein a modulation alphabet may be defined as a set of modulation symbols. A modulation symbol may be represented by a complex number in a constellation diagram wherein the complex number is assigned to a value of one or more bits. For example, a complete QPSK modulation alphabet may consist of modulation symbols representing the bit value combinations "00", "01", "10" and "11". Note however that the term "modulation alphabet" needs not necessarily be used for a complete set of modulation symbols of a modulation scheme. Referring back to QPSK, a modulation alphabet may also be restricted to the modulation symbols representing the bit combinations "00" and "01".

The methods and receiver circuits described herein may be used for various wireless communication networks such as Code Division Multiple Access (CDMA), Time Division Multiple Access (TDMA), Frequency Division Multiple Access (FDMA), Orthogonal FDMA (OFDMA) and Single Carrier FDMA (SC-FDMA) networks. The terms "network", "system" and "radio communications system" may be used synonymously. A CDMA network may implement a radio technology such as Universal Terrestrial Radio Access (UTRA), cdma2000, etc. UTRA includes Wideband-CDMA (W-CDMA) and other CDMA variants. cdma2000 covers IS-2000, IS-95 and IS-856 standards. A TDMA network may implement a radio technology such as Global System for Mobile Communications (GSM) and derivatives thereof such as, e.g., Enhanced Data Rate for GSM Evolution (EDGE), Enhanced General Packet Radio Service (EGPRS), etc. An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). In particular, the methods and receiver circuits described herein may be used in the framework of mobile communication standards supporting multiple predefined modulation schemes or modulation alphabets. For example, the 3GPP Long Term Evolution (LTE) standard, which is based on the GSM/EDGE and UMTS/HSPA (High Speed Packet Access)

technologies, supports QPSK, 16-QAM and 64-QAM. Similarly, each of WiMAX and Wireless LAN supports BPSK, QPSK, 16-QAM and 64-QAM.

In radio communications systems, a transmitter transmitting one or more radio communications signals over one or more radio communications channels may be present. The transmitter may be a base station or a transmitting device included in a user's device, such as a mobile radio transceiver, a handheld radio device or any similar device. Note that, according to the UMTS standard, a base station may also be referred to as "Node B". Radio communications signals transmitted by transmitters may be received by receivers such as a receiving device in a mobile radio transceiver or mobile station, a handheld radio device or any similar device. Receiver circuits as described herein may e.g. be included in such receivers. Note that, according to the UMTS standard, a mobile station may also be referred to as "User Equipment" (UE).

The methods and receiver circuits described herein may be operated according to a Multiple Input Multiple Output (MIMO) technique providing the use of multiple antennas at both the transmitter and receiver. Of course, the methods and receiver circuits described herein may also be operated for the case of only one antenna at the receiver. MIMO is a part of wireless communications standards such as IEEE 802.11n (Wi-Fi), 4G, 3GPP Long Term Evolution, WiMAX and HSPA+. In this context, the term "spatial-multiplexing" may be used which corresponds to a transmission technique in MIMO wireless communication and which may be used to transmit independent and separately encoded data signals, so-called streams, from each of the multiple transmit antennas of a base station. Similarly, a UE may receive multiple transmitted streams by means of a plurality of receive antennas. The encoding of data in spatial-multiplexing may be based on an open-loop approach or a closed-loop approach.

Multi-User (MU) MIMO schemes allow multiple UEs to share the same resource in frequency and time domains, i.e. same resource blocks, and multiplex their signals on the spatial domain. MU-MIMO may be regarded as an extended version of the Space-Division Multiple Access (SDMA) scheme. In 3G/HSPA MU-MIMO, the UEs may also share the same time and channelization code (e.g. Orthogonal Variable Spreading Factor (OVSF)/Spreading Code). For MU-MIMO, a base station may schedule a set of UEs for a data transmission with MU-MIMO. Transmission data is then transmitted from the base station to the scheduled UEs simultaneously. During a data transmission interferences between data streams transmitted from the base station to the co-scheduled UEs may occur. In MU-MIMO, for an appropriate detection of data symbols received at a UE of interest it may be helpful to suppress interferences from co-scheduled UEs (i.e. interfering UEs). Note that the terms "UE of interest" and "co-scheduled UE/interfering UE" do not refer to an identical UE, but correspond to two different mobile stations of two different users. For the purpose of suppressing interferences, it may be required to detect data symbols at the UE of interest, the symbols actually being scheduled for an interfering UE. The detection may be based on or may include a Maximum Likelihood (ML) algorithm or a Near ML algorithm (e.g. sphere decoder, QRD-M, SIC, etc).

In the following, an ML algorithm is specified which may be used for detecting data symbols at the UE of interest, the symbols actually being scheduled for an interfering UE. Reference is now made to a MU-MIMO system in which a base station communicates with a number of K UEs (or receivers) simultaneously on the same time-frequency resource. The base station may include an arbitrary number of n>1 transmission antennas while each of the K UEs includes one or multiple receive antennas. The precoded data x transmitted by the base station at an arbitrary time instant may be expressed as $$x = \frac{1}{\sqrt{K}} \sum_{i=1}^{K} w_i s_i \quad (1)$$

wherein $w_i$ denotes a precoding vector of dimension n×1 for the i-th UE which may be chosen from a precoding codebook having an arbitrary number of entries. In addition, $s_i$ denotes a (normalized) data symbol of a modulation alphabet employed by the base station for encoding the transmitted data for the i-th user. The precoded data x thus corresponds to a vector of dimension n×1 containing the signals sent by the n transmission antennas of the base station. The vector x may be normalized, i.e.

$$E[x^*x]=1 \quad (2)$$

wherein E denotes an expectation operator.

A signal y received by a UE of interest may be expressed as a vector $$y=Hx+v \quad (3)$$

of dimension m×1 wherein H denotes a channel matrix of dimension m×n assumed to be known or estimated at the UE of interest. In addition, v denotes noise, for example Additive White Gaussian Noise (AWGN) having a variance of $\sigma_n^2$. Combining equations (1) and (2), the received signal y may be expressed as $$y = \frac{1}{\sqrt{K}} H \sum_{i=1}^{K} w_i s_i + v \quad (4)$$

or $$y = \frac{1}{\sqrt{K}} H w_1 s_1 + \frac{1}{\sqrt{K}} H \sum_{i=2}^{K} w_i s_i + v. \quad (5)$$

At the UE of interest it may be desired to decode the transmitted signal s from the received signal y. An ML solution may correspond to finding the most likely solution $$\hat{s} = \underset{s \in G^n}{\mathrm{argmax}} Pr(y \mid s) \quad (6)$$

for the transmitted signal s. Here, G denotes a modulation alphabet including a number of M modulation symbols that has been used for modulating the transmitted data while the function "Pr" denotes a probability of a respective solution s. The ML solution of equation (6) corresponds to minimizing the noise v, i.e. by finding the minimum value $$\hat{s} = \underset{s \in G^n}{\mathrm{argmin}} \|y - H_{\text{eff}} s\|^2 \quad (7)$$

wherein $\|\cdot\|$ denotes an arbitrary norm, for example an $L_2$ norm and in particular a Euclidean norm. In addition, $H_{\text{eff}}$ denotes an effective channel matrix which may be defined as $H_{\text{eff}} = H(w_1 \ w_2) = (h_1 \ h_2)$.

Equations (6) and (7) may be solved by a brute-force implementation in which all n transmission antennas are scanned. That is, taking into account the M modulation symbols of the employed modulation scheme G all possible values for s in equation (6) are considered resulting in $M^n$ hypothesis or hypothetical values. For example, if G corresponds to a 64-QAM modulation alphabet including 64 modulation symbols and the number of transmission antennas n equals two, a brute-force implementation requires determining 4096 hypotheses.

In the following, a further ML scheme is described in which the number of hypotheses to be determined may be decreased by merely scanning n−1 transmission antennas. For each hypothesis on the n−1 transmission antennas an optimal choice for the remaining transmission antenna may then be calculated in a further step which is described below. The further ML scheme may at least partly coincide with an ML scheme presented in the document "Efficient maximum likelihood detector for MIMO systems with small number of streams", in Proc. of IEE Electronic Letters, Vol. 43, No. 22, October 2007 by Y. Lomnitz and D. Andelman which is included herein by reference.

The minimization of equation (6) may be expressed as $$\hat{s} = \underset{\tilde{s} \in G^{n-1}}{\operatorname{argmin}} d_s^2 = \underset{\tilde{s} \in G^{n-1}}{\operatorname{argmin}} \|y - \tilde{H}_{\mathit{eff}}\tilde{s} - h_1 s_1\|^2 \quad (8)$$

wherein $s_1$ denotes the signal transmitted by the first transmission antenna of the base station and $\tilde{s}$ denotes a vector of dimension n−1 including the signals from the remaining n−1 transmission antennas. Further, $h_1$ denotes the first column of the channel matrix $H_{\mathit{eff}}$ and $\tilde{H}_{\mathit{eff}}$ denotes a matrix including columns 2 to n of the channel matrix H.

An optimal choice for a single transmission antenna may correspond to a Maximum Ratio Combining (MRC) solution in a Maximum Likelihood Sequence Estimation (MLSE) sense. That is, the MLSE of a stream transmitted by a single transmission antenna and received by one or more antennas may be decomposed into a maximal ratio combiner followed by an MLSE decoder. In particular, an ML estimator of a single data symbol from a discrete constellation may be an MPRC followed by a slicer. An optimal choice for a single transmission antenna thus may be expressed as $$\hat{s} = \underset{s \in G}{\operatorname{argmin}} \|y - hs\|^2 = \operatorname{slice}[(h*h)^{-1} h * y] \quad (9)$$

wherein the asterisk denotes complex (or hermitian) conjugation. The function "slice" may be defined as $$\operatorname{slice}(x) = \underset{s \in G}{\operatorname{argmin}} \|x - s\|^2. \quad (10)$$

Hence, in order to find the solution $\hat{s}$ according to the further ML scheme, all combinations of $\tilde{s}$ are scanned and given a hypothesis on $\tilde{s}$, the minimum value of $d_s^2$ or $\|y-Hs\|^2$ with respect to $s_1$ is obtained by applying equation (9) resulting in $$\hat{s}_1(\tilde{s}) = \underset{s_1 \in G}{\operatorname{argmin}} \|y - \tilde{H}_{\mathit{eff}}\tilde{s} - h_1 s_1\|^2 = \operatorname{slice}[(h_1 * h_1)^{-1} h_1 * (y - \tilde{H}_{\mathit{eff}}\tilde{s})]. \quad (11)$$

Considering now the case of two transmission antennas, i.e. n=2, equation (8) becomes $$\hat{s} = \underset{s_1 \in M_1}{\operatorname{argmin}} d_s^2 = \underset{s_1 \in M_1}{\operatorname{argmin}} \|y - h_1 s_1 - h_2 s_2\|^2 \quad (12)$$

wherein the index 1 may denote the UE of interest and the index 2 may denote the interfering UE. Applying the above described further ML scheme, in a first step all $m_1$ possibilities for $s_1$ are scanned wherein $m_1$ denotes a number of constellation points for a particular modulation scheme $M_1$ employed at the UE of interest. For each of these possibilities, the ML solution for $s_2$ is calculated by $$\hat{s}_2(s_1) = \operatorname{slice}[(h_2 * h_2)^{-1} h_2 * (y - h_1 s_1)] \quad (13)$$

wherein $s_2$ may be chosen from a modulation alphabet G, i.e. $s_2 \in G$. In other words, for each of the indicated possibilities a distance $$d_s^2 = \|y - h_1 s_1 - h_2 \hat{s}_2\|^2 \quad (14)$$

is calculated. The minimum of the values calculated for the distance $d_s^2$ then corresponds to the most likely value of s. Note that an illustrative example of the minimum distance becomes apparent from FIG. 3.

For the case of s being coded, it may not be desired to determine the most likely value of s (see above), but to determine bit metrics or symbol metrics in order to perform soft decoding or turbo decoding. For this case, Log Likelihood Ratios (LLR) may be determined for a number of l bits wherein l=1, . . . , $\log_2(M_1)$. Depending on the value of the regarded bit, values $d_s$ are calculated according to equation (14). For each calculated value $d_s$, values $d^1_{min}$ and $d^0_{min}$ are updated, the superscript denoting the bit value. If the bit value equals one, the value $d^1_{min}$ is updated according to $$d_{min}^1(l) = \min(d_{min}^1(l), d_s). \quad (15)$$

Similarly, if the bit value equals zero, the value $d^0_{min}$ is updated according to $$d_{min}^0(l) = \min(d_{min}^0(l), d_s). \quad (16)$$

Note that the values $d_{min}^0(l)$ and $d_{min}^1(l)$ initially need to be initialized to an initial value, for example a value of zero or +∞. Having obtained the minimum values $d^0_{min}$ and $d^1_{min}$, an LLR value may be calculated according to $$LLR_l = (d_{min}^0(l) - d_{min}^1(l)) \frac{1}{\sigma_n^2}. \quad (17)$$

Of course, further schemes may be used to determine a transmitted signal from a received signal y. For example, an MU-MIMO equalizer may correspond to an interference unaware equalizer e.g. including a Maximum Ratio Combiner. An MRC scheme may be expressed by $$\hat{s}_{MRC} = \frac{h_{\mathit{eff}}^H y}{\|h_{\mathit{eff}}\|^2} \quad (18)$$

which, using equation (5), may also be written as $$\hat{s}_{MRC} = \frac{h_{\mathit{eff}}^H s_1}{\|h_{\mathit{eff}}\|^2} + \frac{h_{\mathit{eff}}^H H_1 \sum_{i=2}^{K} w_i s_i}{\|h_{\mathit{eff}}\|^2} + v^*. \quad (19)$$

In order to compute LLRs corresponding to the symbol $\hat{s}_{MRC}$, a UE of interest may completely neglect the interference term and assume the SINR to be $$SINR = \frac{\|h_{eff}\|^2}{\sigma_n^2}. \tag{20}$$

Since utilizing an MRC scheme may not combat a co-scheduled UE interference, its performance may deteriorate significantly when the interference power is not negligible compared to that of additive noise, i.e. at high and medium SNRs.

A further scheme to determine a transmitted signal s may be performed by an interference aware equalizer e.g. including an Interference Rejection Combiner (IRC). An IRC scheme may be expressed by $$\hat{s}_{IRC} = SINR_{IRC}\hat{s}_{IRC\text{-}Norm} \tag{21}$$

wherein $\hat{s}_{IRC\text{-}Norm}$ and $SiNR_{IRC}$ may be defined by $$\hat{s}_{IRC-Norm} = \frac{h_{eff}^H R_{xx}^{-1} y}{h_{eff}^H R_{xx}^{-1} h_{eff}} \tag{22}$$

and $$SINR_{IRC} = h_{eff}^H R_{xx}^{-1} h_{eff}, \tag{23}$$

respectively. $R_{xx}$ denotes an interference plus noise covariance matrix which may be expressed by $$R_{xx} = \sum_{i=2}^{K}\left(\frac{H_1 w_i}{\sqrt{K}}\right)\left(\frac{H_1 w_i}{\sqrt{K}}\right)^H + \sigma_n^2 I \tag{24}$$

wherein I denotes an identity matrix. A pre-requisite for performing an IRC scheme may be that the precoding vectors of the interfering UE are known to the UE of interest.

FIG. 1 schematically illustrates a detection of a data symbol 1 received at a UE of interest, the data symbol 1 being actually scheduled for an interfering UE. A similar detection may e.g. occur in a radio communications system based on the LTE standard. In connection with FIG. 1, it is assumed that the received data symbol 1 has actually been modulated according to a QPSK modulation scheme while a detection of the received symbol at the UE of interest is based on a 16-QAM modulation alphabet. Note that the modulation scheme used by the interfering UE is not known to the UE of interest. In FIG. 1, the modulation symbols of the QPSK and 16-QAM schemes are illustrated by small crosses and circles, respectively. For the case of FIG. 1, the use of the 16-QAM modulation alphabet may be constant or permanent. That is, detecting data symbols at the UE of interest is always based on the 16-QAM modulation alphabet independent of the actually applied modulation scheme and will not be changed during an operation of the UE of interest. Note further that the received data symbol 1 is shifted with respect to the actual QPSK symbol 2 that has been used for a modulation. The distance between the received data symbol 1 and the actual QPSK symbol 2 is illustrated by an arrow of length $d_T$ and may be considered as noise causing the shift between the received data symbol 1 and the QPSK symbol 2.

In FIG. 1, detecting the data symbol 1 at the UE of interest is merely based on the 16-QAM modulation alphabet and corresponds to finding the minimum distance between the received data symbol 1 and the set of 16-QAM modulation symbols. The distance between the received data symbol 1 and the nearest 16-QAM symbol 3 is illustrated by an arrow of length $d_F$. Referring back to the above described further ML scheme, detecting the data symbol corresponds to finding the minimum distance according to equation (14) wherein $s_2 \in G = M_{16\text{-}QAM}$, the set $M_{16\text{-}QAM}$ including all modulation symbols of the 16-QAM modulation alphabet. In other words, FIG. 1 illustrates a quantization error when assuming the modulation alphabet $s_2$ (i.e. the modulation symbols of the interfering UE) to be 16-QAM regardless of the actual modulation alphabet of the interfering UE.

Figure 2:
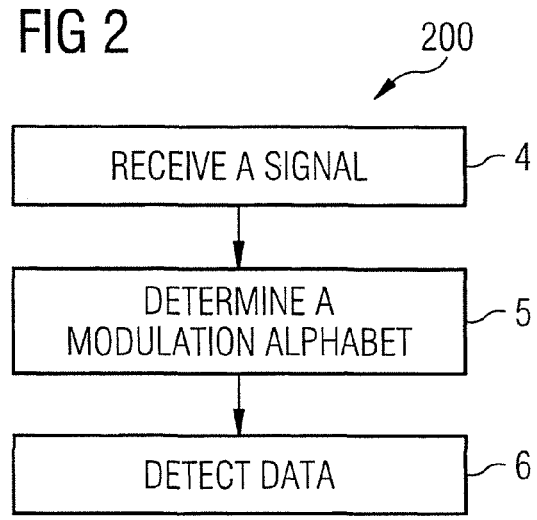
FIG. 2 schematically illustrates a method 200.

FIG. 2 schematically illustrates a method 200 including method steps 4, 5 and 6. In the method step 4, a signal is received at a first receiver circuit on the basis of a mobile communications standard supporting multiple predefined modulation alphabets. For example, a receiver circuit of a mobile communications systems may receive a signal wherein the system is based on the LTE standard which supports the modulation schemes QPSK, 16-QAM and 64-QAM. The received signal includes first data dedicated to the first receiver circuit and second data dedicated to a second receiver circuit. Note that the first and second receiver circuits are particularly included in different UEs wherein the first receiver circuit may be included in a UE of interest and the second receiver circuit may be included in an interfering UE. In the method step 5, a modulation alphabet of the multiple predefined modulation alphabets is determined during an operation of the first receiver circuit. For example, a modulation alphabet $M_2 \in G \in \{M_{QPSK}, M_{16\text{-}QAM}, M_{64\text{-}QAM}\}$ may be determined wherein $M_{QPSK}$, $M_{16\text{-}QAM}$ and $M_{64\text{-}QAM}$ include all modulation symbols of the QPSK modulation scheme, the 16-QAM modulation scheme and the 64-QAM modulation scheme, respectively. In the method step 6, data is detected depending on the second data at the first receiver circuit on the basis of the determined modulation alphabet. Note that, compared to a detection according to FIG. 1, the modulation alphabet used for the detection needs not to be constant or permanent, but may vary over time. Various embodiments of method 200 are described below. In addition, detecting a data symbol on the basis of method 200 is described in connection with FIG. 3.

Figure 3:
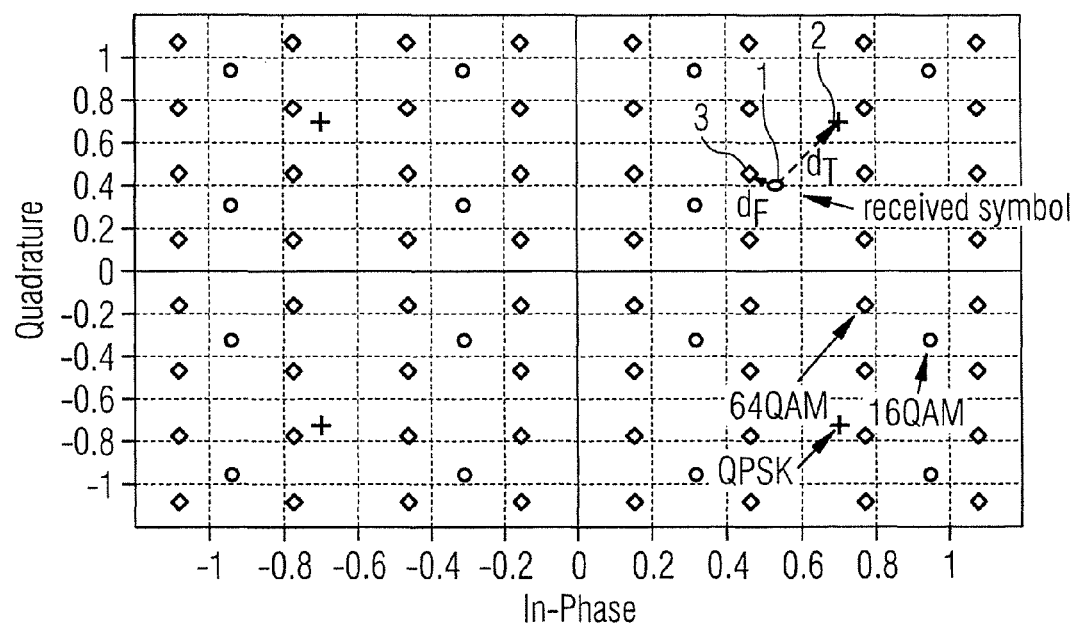
FIG. 3 schematically illustrates a detection of a data symbol.

FIG. 3 schematically illustrates a detection of a data symbol 1 received at a UE of interest, the data symbol 1 actually being scheduled for a co-scheduled interfering UE. A similar detection may e.g. occur in a radio communications system based on the LTE standard. Similar to FIG. 1 it is assumed that the received data symbol 1 is actually modulated according to a QPSK modulation scheme. In contrast to FIG. 1, detecting the data symbol 1 at the UE of interest is not restricted to a constant or permanent modulation alphabet, but may be based on a modulation alphabet determined during an operation of the UE of interest. For the exemplary case of an LTE system, a detection may thus not only be based on the 16-QAM modulation alphabet as in FIG. 1, but may further be based on e.g. the QPSK modulation alphabet or the 64-QAM modulation alphabet which are also supported by the LTE standard. In FIG. 3, the modulation symbols of the QPSK and 16-QAM schemes are illustrated by small crosses and circles, respectively, while the modulation symbols of the 64-QAM scheme are illustrated by small diamonds. The minimum distance between the received data symbol 1 and the symbols of these modulation schemes is illustrated by an arrow of length $d_F$.

Comparing the minimum distances $d_F$ of FIGS. 1 and 3, it becomes apparent that the minimum distance $d_F$ of FIG. 3 is smaller than the minimum distance $d_F$ of FIG. 3. Note that the minimum distance $d_F$ of FIG. 3 corresponds to a distance between the received data symbol 1 and a symbol of the 64-QAM modulation alphabet, but not the 16-QAM modulation alphabet as shown in FIG. 1. That is, providing the possibility of determining a modulation alphabet during an operation of the receiver circuit may result in a reduced minimum distance $d_F$. A reduced distance may result in a smaller quantization error since the nearest modulation symbol 3 in FIG. 3 is closer to the QPSK modulation symbol 1 compared to FIG. 1. In addition, a minimization of the quantization error may lead to an improved performance of the receiver. Performances of receivers using various decoding schemes are illustrated in FIGS. 8A to 8D.

In the following, an exemplary and more detailed method similar to method 200 is provided. In this connection, a mobile communications system based on the LTE standard supporting the modulation schemes QPSK, 16-QAM, 64-QAM and two transmission antennas are considered.

In a step A, equation (13) with interchanged indices 1 (denoting the UE of interest) and 2 (denoting the interfering UE) may be used to determine values $$\hat{s}_1(s_2) = \text{slice}[(h_1^* h_1)^{-1} h_1^* (y - h_2 s_2)]. \tag{25}$$

The corresponding modulation scheme $M_2$ employed at the interfering UE may be $M_2 = G = \{M_{QPSK}, M_{16\text{-}QAM}, M_{64\text{-}QAM}\}$. Since the QPSK, 16-QAM and 64-QAM modulation alphabets include 4, 16 and 64 modulations symbols, respectively, step A provides 84 values for $\hat{s}_1$. Note that, in a more general case, $M_2$ may also be considered as $M_2 \in G \in \{M_{QPSK}, M_{16\text{-}QAM}, M_{64\text{-}QAM}\}$.

In a further step B, Euclidean distances may be determined on the basis of equation (14) with interchanged indices 1 and 2, i.e.

$$d_s^2 = \|y - h_2 s_2 - h_1 \hat{s}_1\|^2. \tag{26}$$

For the considered modulation alphabet $M_2$, step B provides Euclidean distances for all constellation points of the modulation schemes $M_{QPSK}$, $M_{16\text{-}QAM}$ and $M_{64\text{-}QAM}$, i.e. 84 values for $d_s^2$.

In a further step C, a minimum Euclidean distance $d_{M_i}$ for each modulation scheme $M_i$ included in the modulation alphabet $M_2$ may be determined. For the considered modulation alphabet $M_2$, the modulation schemes $M_i$ are $M_{QPSK}$, $M_{16\text{-}QAM}$ and $M_{64\text{-}QAM}$ such that step C provides three values for $d_{M_i}$. That is, for the QPSK modulation scheme one value $d_{M_{QPSK}}$ is determined out of four values for $d_s^2$, for the 16-QAM modulation scheme one value $d_{M_{16\text{-}QAM}}$ is determined out of 16 values for $d_s^2$ and for the 64-QAM modulation scheme one value $d_{M_{64\text{-}QAM}}$ is determined out of 64 values for $d_s^2$.

Since the minimum Euclidean distance obtained by step C may be higher for lower modulation schemes due to a smaller number of constellation points, a bias reduction may be performed for each of the modulation schemes $M_i$ in a further step D. For example, a possible bias reduction may be expressed by $$\hat{d}_{M_i} = \left(d_{M_i} - \frac{\sigma_n^2 N_{rx}}{N_{M_i}}\right) A_{M_i} \tag{27}$$

wherein $\hat{d}_{M_i}$ denotes a biased minimum Euclidean distance. For the considered case, $A_{M_i}$ may be chosen as $A_{M_i} \in$ $$\left(\frac{\sqrt{2}}{N_{M_i}}, \frac{\sqrt{10}}{N_{M_i}}, \frac{\sqrt{42}}{N_{M_i}}\right)$$

with $N_{M_i} \in (2,4,6)$ denoting a constellation order of the respective modulation scheme $M_i$. For the considered modulation alphabet $M_2$, step D provides three values for $\hat{d}_{M_i}$.

In a further step E, the biased values $\hat{d}_{M_i}$ (or alternatively the unbiased values $d_{M_i}$) may be accumulated or filtered over scheduled subcarriers in a subframe. An accumulation may be based on previous and currently estimated values for the minimum Euclidean distance $\hat{d}_{M_i}$. The accumulation is implementation specific and may, for example, be expressed by $$\tilde{d}_{M_i}(j) = E(d_{M_i}) = \sum_{l=1}^{j} \hat{d}_{M_i}(l). \tag{28}$$

Here, $1 \leq j \leq N_s$ denotes the position of the current subcarrier or symbol processed in a group of subcarriers or symbols and $N_s$ denotes the number of subcarriers or symbols in a group.

In a further step F, a modulation set $\hat{M}_2$ may be determined by $$\hat{M}_2 = \underset{QPSK, 16QAM, 64QAM}{\text{argmin}} \lfloor \tilde{d}_{M_i} \rfloor. \tag{29}$$

Note that, if step E of accumulating the Euclidean distances has been omitted, the modulation set $\hat{M}_2$ may alternatively be determined by $$\hat{M}_2 = \underset{QPSK, 16QAM, 64QAM}{\text{argmin}} [\hat{d}_{M_i}]. \tag{30}$$

In a further step G, an ML algorithm according to equations (12) to (17) may be performed. Note, however, that in step G the indices 1 and 2 are particularly not interchanged like in equations (25) and (26).

Step G may be replaced by the following steps H and I. That is, the exemplary described method may correspond to performing steps A to G or performing steps A to F, H and I. Referring to the above, a set of Euclidean values $d_s$ has been obtained in step B. In the step H, the values $d_s$ associated with the obtained modulation set $\hat{M}_2$ are determined from this set of Euclidean values. If the modulation set $\hat{M}_2$ e.g. corresponds to the modulation alphabet $M_{16\text{-}QAM}$, 16 values are determined from the 84 values obtained in step B. In the step I, the minimum of these, e.g. 16, determined values is determined which then corresponds to the estimated symbol value. Of course, LLRs may be determined in a further step.

In the following, various embodiments of the methods described herein are specified. Of course, specified features of these embodiments may be combined in arbitrary ways resulting in further embodiments which are not explicitly described for the sake of simplicity. In addition, it is understood that a receiver circuit configured to perform methods described herein may include units configured to perform one or more of the specified features. Note that all specified features may be applied and combined in connection with the method 200 as well as the methods 400 and 500 described below.

According to an embodiment of the methods described herein, a method may include a step of mitigating or attenuating an interference based on the second data at the first receiver circuit on the basis of the determined modulation alphabet. For example, the actual attenuation of interference may take place due to a joint detection of the UE of interest and an interfering UE after the modulation of the interfering UE has been estimated.

According to an embodiment of the methods described herein, determining the modulation alphabet may be performed periodically on the basis of an arbitrary time period. In particular, determining the modulation alphabet may be performed for each resource block or for an arbitrary number of resource blocks dedicated to the first receiver circuit.

According to an embodiment of the methods described herein, determining the modulation alphabet may include a step of determining a set of Euclidean distances between a received data symbol depending on the second data and a set of modulation symbols of the multiple predefined modulation alphabets. Referring back to the previously described exemplary method, the additional step may correspond to or may include the step B.

According to an embodiment of the methods described herein, the set of modulation symbols includes all modulation symbols of all multiple predefined modulation alphabets. Referring back to the previously described method, equations (25) and (26) may be calculated on the basis of a modulation scheme defined by $M_2 = G = \{M_{QPSK}, M_{16-QAM}, M_{64-QAM}\}$.

According to an embodiment of the methods described herein, determining a Euclidean distance may include a step of performing a Maximum Likelihood algorithm or a Near Maximum Likelihood algorithm. Referring back to the previously described exemplary method, the additional step may correspond to or may include the steps A and/or B.

According to an embodiment of the methods described herein, a method may further include a step of determining at least two first minimum Euclidean distances from the set of Euclidean distances wherein each of the at least two first minimum Euclidean distances may depend on one of the multiple predefined modulation alphabets, respectively. Referring back to the previously described exemplary method, the additional step may correspond to or may include the step C.

According to an embodiment of the methods described herein, determining the modulation alphabet may include performing a bias reduction of the at least two first minimum Euclidean distances. Referring back to the previously described exemplary method, the additional step may correspond to or may include the step D.

According to an embodiment of the methods described herein, determining the modulation alphabet may include determining a second minimum Euclidean distance from the bias reduced Euclidean distances. Referring back to the previously described exemplary method, the additional step may correspond to or may include the step F.

According to an embodiment of the methods described herein, the received signal may be based on multiple subcarriers and the determining of the modulation alphabet may be based on a set of scheduled subcarriers. In particular, determining the modulation alphabet may include accumulating and/or filtering at least one Euclidean distance over the set of scheduled subcarriers in a subframe. Referring back to the previously described exemplary method, the additional step may correspond to or may include the step E.

According to an embodiment of the methods described herein, detecting the data may include a step of performing a Maximum Likelihood algorithm or a Near Maximum Likelihood algorithm. Referring back to the previously described exemplary method, the additional step may correspond to or may include the step G.

According to an embodiment of the methods described herein, the first data needs not to include information on a modulation alphabet or a modulation scheme used for encoding the second data. In other words, a UE of interest detects received symbols for a co-scheduled UE on the basis of a modulation alphabet without knowing the modulation scheme that has actually been employed by the base station to encode data scheduled for the interfering UE or the modulation scheme used by the interfering UE for decoding received data symbols. For example, referring back to FIG. 3, the UE of interest does not receive information that the received data symbol 1 actually corresponds to a QPSK symbol 3. Rather, the receiver circuit or UE of interest detects the symbol on the basis of a modulation alphabet which may be determined during an operation of the UE of interest.

According to an embodiment of the methods described herein, the received signal may include first data transmitted from a first radio cell and second data transmitted from a second radio cell. For example, referring back to the detection of FIG. 3, the received data symbol 1 for the co-scheduled UE may be transmitted from a base station which is located in a radio cell which is not identical to the radio cell the receiver circuit or UE of interest is located at the same time. For example, the received data symbol 1 may be transmitted from a neighboring or directly adjacent radio cell.

According to an embodiment of the methods described herein, the first data may include at least one first spatial data stream and the second data may include at least one second spatial data stream. For example, one or more spatial data streams may be associated with the UE of interest while one or more spatial data streams may be associated with each of the interfering UEs, respectively. The spatial data streams are transmitted from a base station to the respective UE wherein a spatial data stream associated with an interfering UE may interfere with a data stream of the UE of interest.

According to an embodiment of the methods described herein, the first data and the second data may be transmitted simultaneously on a same time-frequency resource. In particular, the received signal may be received on the basis of a Multi-User Multiple-Input Multiple-Output technology. Further, the first data and the second data may particularly be transmitted using the same time and channelization code (e.g. in 3G/HSPA).

According to an embodiment of the methods described herein, each of the multiple predefined modulation alphabets is configured to encode all value combinations of at least two bits. It is thus not possible for a predefined modulation alphabet to merely encode a reduced number of value combinations. For example, for the case of two bits it is not possible that a predefined modulation alphabet is merely configured to encode the value combinations "00" and "01", but not configured to encode the combinations "10" and "11". Rather, the modulation alphabet has to include all possible value combinations "00", "01", "10" and "11". For the case of LTE, it is thus not possible to identify a proper subset of one of the modulation alphabets $M_{QPSK}$, $M_{16-QAM}$ or $M_{64-QAM}$ as a predefined modulation alphabet.

According to an embodiment of the methods described herein, the first data and the second data is transmitted by a base station, the first receiver circuit is included in a first User Equipment and the second receiver circuit is included in a second User Equipment. For this case, the received signal is received in a downlink direction.

Figure 4:
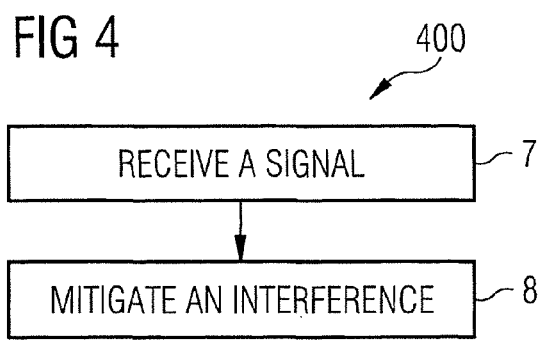
FIG. 4 schematically illustrates a method 400.

FIG. 4 schematically illustrates a method 400 including method steps 7 and 8. In the method step 7, a signal is received at a first receiver circuit on the basis of a mobile communications standard supporting multiple predefined modulation alphabets wherein the received signal includes first data scheduled by a base station for the first receiver circuit and second data scheduled by the base station for a second receiver circuit. In the method step 8, an interference is mitigated based on the second data at the first receiver circuit on the basis of a modulation alphabet which is determined during an operation of the first receiver circuit. Note that the method 400 is similar to the method 200 such that all comments made in connection with the method 200 may also hold true for the method 400.

FIG. 5 schematically illustrates a method 500 including method steps 9, 10 and 11. In the method step 9, a signal is received at a first receiver circuit on the basis of a mobile communications standard supporting multiple predefined modulation alphabets wherein the received signal includes first data dedicated to the first receiver circuit and second data dedicated to a second receiver circuit. In the method step 10, a modulation alphabet of the multiple predefined modulation alphabets is determined on the basis of the received signal. In the method step 11, data is detected depending on the second data at the first receiver circuit on the basis of the determined modulation alphabet. Note that the method 500 is similar to the method 200 such that all comments made in connection with the method 200 may also hold true for the method 500.

FIG. 6 schematically illustrates a receiver circuit 600 which may be configured to perform the method 200 in one embodiment, but is not so limited. The receiver circuit 600 is configured to receive a signal on the basis of a mobile communications standard supporting multiple predefined modulation alphabets wherein the received signal includes first data dedicated to the receiver circuit 600 and second data dedicated to a second receiver circuit which is not illustrated (see FIG. 2, method step 4). The receiver circuit 600 includes a first unit 12 configured to determine a modulation alphabet of the multiple predefined modulation alphabets during an operation of the receiver circuit (see FIG. 2, method step 5). The receiver circuit 600 further includes a second unit 13 configured to detect data depending on the second data at the receiver circuit 600 on the basis of the determined modulation alphabet (see FIG. 2, method step 6).

It is understood that the receiver circuit 600 may include further components that are not illustrated for the sake of simplicity. In particular, the receiver circuit 600 may include units configured to perform one or more of the features described in connection with the method 200. In addition, the receiver circuit 600 may include one or more input and output ports for receiving and outputting signals, down conversion units to down-convert analog signals lying in a radio frequency range into an intermediate frequency band or into the baseband, up conversion units for a conversion vice versa, Analog-to-Digital Converters (ADC), Digital-to-Analog Converters (DAC). The receiver circuit 600 may further include amplifiers, analog filters, digital filters, etc. The receiver circuit 600 may further include an equalizer to decode received data into metrics or LLR values and a decoder, e.g. a turbo decoder or a Viterbi decoder, to obtain an estimation of received data based on the metrics. Note that the receiver circuit 600 may also be configured to operate as a transmitter circuit.

FIG. 7 schematically illustrates a receiver circuit 700 which may be configured to perform the method 400 in one embodiment, but is not so limited. The receiver circuit 700 is configured to receive a signal on the basis of a mobile communications standard supporting multiple predefined modulation alphabets wherein the received signal includes first data scheduled by a base station for the receiver circuit 700 and second data scheduled by the base station for a second receiver circuit which is not illustrated (see FIG. 4, method step 7). The receiver circuit 700 includes a unit 14 configured to mitigate an interference based on the second data at the receiver circuit 700 on the basis of a modulation alphabet which is determined during an operation of the receiver circuit 700 (see FIG. 4, method step 8). Of course, the receiver circuit 700 may include further components which are not illustrated for the sake of simplicity. All comments made in connection with the receiver circuit 600 may hold true for the receiver circuit 700.

Figure 8A:
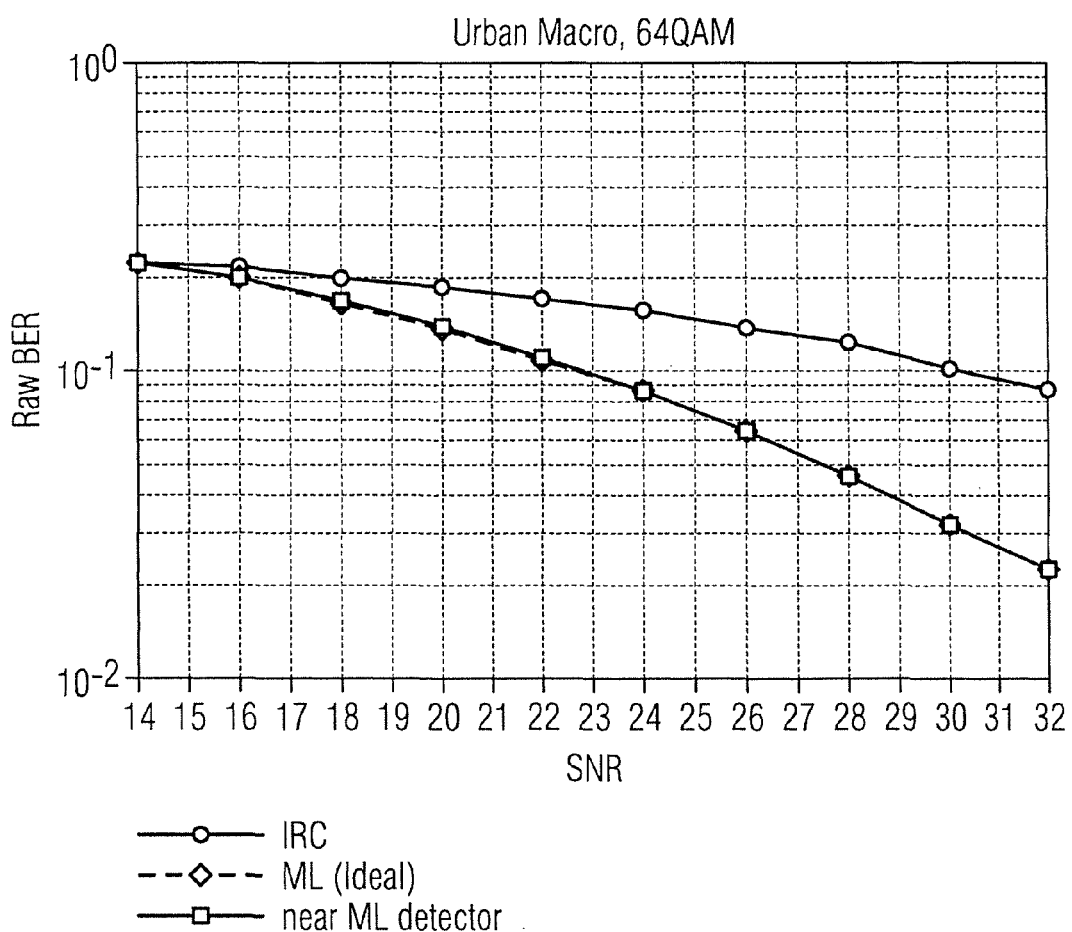
Figure 8B:
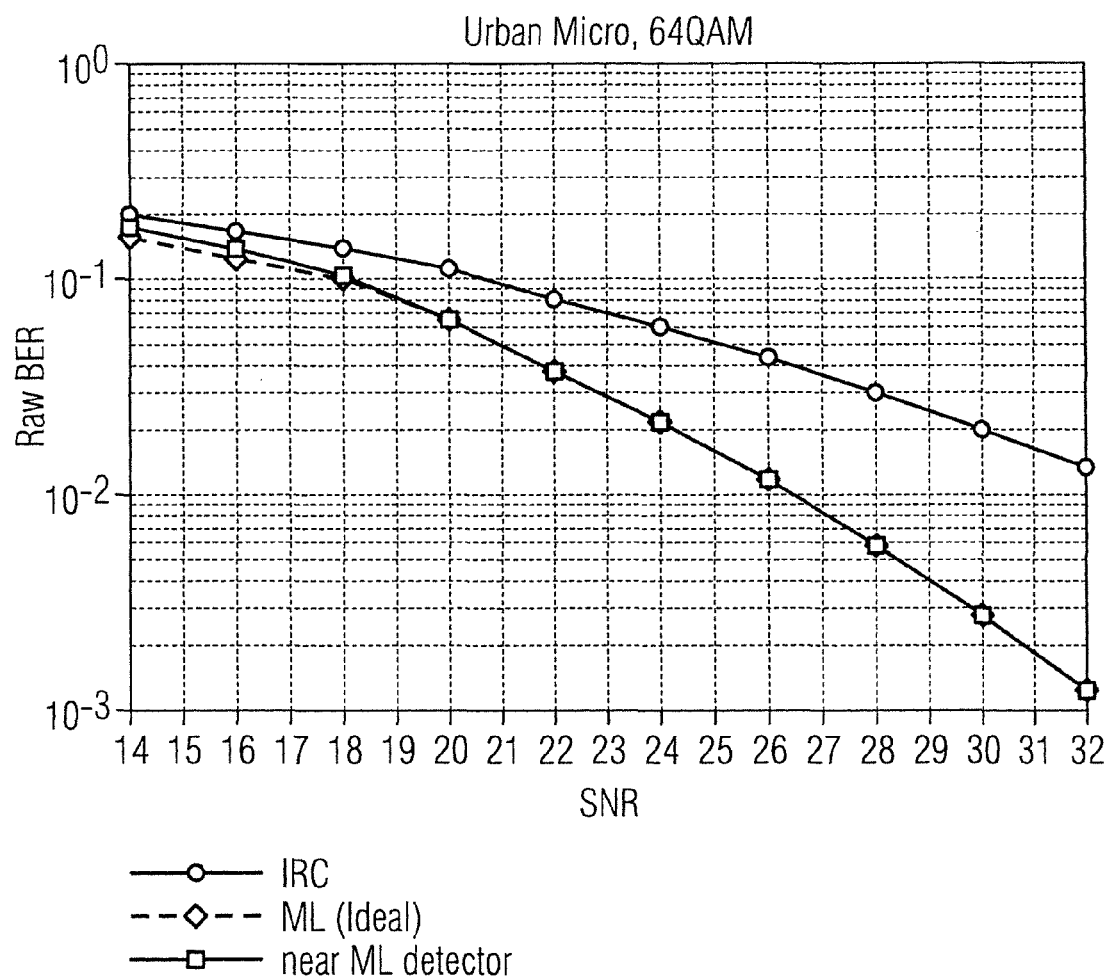

FIGS. 8A to 8D schematically illustrate performances of various receiver circuits including different types of detectors. In FIGS. 8A and 8B, an uncoded Bit Error Rate (Raw BER) is plotted against a Signal to Noise Ration (SNR) in dB while in FIGS. 8C and 8D a Block Error Rate (BLER) is plotted against an average SNR in dB. For each of FIGS. 8A to 8D an LTE radio communications system is considered wherein a line including small circles illustrates a performance of a receiver circuit including an Interference Rejection Combiner (see IRC) while a line including small diamonds illustrates a performance of a receiver circuit including an ideal ML detector, i.e. an ML detector to which the modulation scheme employed by the interfering co-scheduled UE is known. In addition, a line including small squares illustrates a performance of a receiver circuit performing a method similar to one of the methods 200, 400 and 500. The illustrated scenarios are further specified by variables "Urban Micro" and "Urban Macro" which are e.g. known from various 3GPP specification. In FIGS. 8C and 8D, additional values of a Channel Quality Indicator (CQI) are provided.

Thus, FIG. 8A illustrates an uncoded BER performance with 64-QAM for the UE of interest in an Urban Macro Channel, FIG. 8B illustrates an uncoded BER performance with 64-QAM for the UE of interest in an Urban Micro Channel, FIG. 8C illustrates a BLER performance with 64-QAM (Code rate=0.5) for the UE of interest in an Urban Macro Channel, and FIG. 8D illustrates a BLER performance with 64-QAM (Code rate=0.75) for the UE of interest in an Urban Micro Channel.

From FIGS. 8A and 8B it becomes apparent that the detection according to one of the methods 200, 400 and 500 outperforms the detection based on the IRC detector. Further, from FIGS. 8C and 8D it can be seen that a detection according to one of the methods 200, 400 and 500 exhibits a similar performance as a detection based on the ideal ML detector in both channel scenarios. In channels having a high spatial correlation (see FIG. 8C), a detection according to one of the methods 200, 400 and 500 outperforms a detection based on the IRC detector by approximately 8 dB while in channels having a low spatial correlation (see FIG. 8D) a gain of approximately 4 dB is achieved.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

What is claimed is:

1. A method, comprising:
receiving a signal at a first receiver circuit on the basis of a mobile communications standard supporting multiple predefined modulation alphabets, wherein the received signal comprises first data transmitted by a transmitter to the first receiver circuit and second data transmitted by a transmitter to a second, different receiver circuit, and wherein the second data interferes with the first data;
determining a modulation alphabet of the multiple predefined modulation alphabets during an operation of the first receiver circuit; and
detecting the second data at the first receiver circuit on the basis of the determined modulation alphabet.

2. The method of claim 1, further comprising:
mitigating an interference based on the second data at the first receiver circuit on the basis of the determined modulation alphabet.

3. The method of claim 1, wherein determining the modulation alphabet is based on the received signal.

4. The method of claim 1, wherein determining the modulation alphabet is performed periodically.

5. The method of claim 1, wherein determining the modulation alphabet is performed for each resource block or a group of resource blocks dedicated to the first receiver circuit.

6. The method of claim 1, wherein determining the modulation alphabet comprises:
determining a set of Euclidean distances between a received data symbol depending on the second data and a set of modulation symbols of the multiple predefined modulation alphabets.

7. The method of claim 6, wherein the set of modulation symbols comprises all modulation symbols of all multiple predefined modulation alphabets.

8. The method of claim 6, wherein determining the Euclidean distance comprises:
performing a Maximum Likelihood algorithm or a Near Maximum Likelihood algorithm.

9. The method of claim 6, further comprising:
determining at least two first minimum Euclidean distances from the set of Euclidean distances wherein each of the at least two first minimum Euclidean distances depends on one of the multiple predefined modulation alphabets, respectively.

10. The method of claim 9, wherein determining the modulation alphabet comprises:
performing a bias reduction of the at least two first minimum Euclidean distances.

11. The method of claim 10, wherein determining the modulation alphabet further comprises:
determining a second minimum Euclidean distance from the bias reduced Euclidean distances.

12. The method of claim 1, wherein the received signal is based on multiple subcarriers and the determining of the modulation alphabet is based on a set of scheduled subcarriers.

13. The method of claim 12, wherein the determining of the modulation alphabet comprises accumulating or filtering, or both, at least one Euclidean distance over the set of scheduled subcarriers in a subframe.

14. The method of claim 1, wherein detecting the data comprises:
performing a Maximum Likelihood algorithm or a Near Maximum Likelihood algorithm on the received signal.

15. The method of claim 1, wherein the first data does not comprise information on a modulation alphabet used for encoding or modulating the second data.

16. The method of claim 1, wherein the received signal comprises data transmitted from a first radio cell and data transmitted from a second radio cell.

17. The method of claim 1, wherein the first data and the second data are transmitted simultaneously on a same time-frequency resource.

18. The method of claim 1, wherein the first data and the second data are transmitted simultaneously at a same time and on a same channelization/spreading code.

19. The method of claim 1, wherein the received signal is received on the basis of a Multi-User Multiple-Input Multiple-Output technology.

20. The method of claim 1, wherein each of the multiple predefined modulation alphabets is configured to encode all value combinations of at least two bits.

21. The method of claim 1, wherein the received signal is received in a downlink direction.

22. The method of claim 1, wherein the first data and the second data is transmitted by a base station, the first receiver circuit is comprised by a first User Equipment and the second receiver circuit is comprised by a second User Equipment.

23. A method, comprising:
receiving a signal at a first receiver circuit on the basis of a mobile communications standard supporting multiple predefined modulation alphabets wherein the received signal comprises first data transmitted by a transmitter to the first receiver circuit and second data transmitted by a transmitter to a second, different receiver circuit, and wherein the second data interferes with the first data; and
determining a modulation alphabet of the multiple predefined modulation alphabets on the basis of the received signal; and
detecting the second data at the first receiver circuit on the basis of the determined modulation alphabet.

24. A receiver circuit configured to receive a signal on the basis of a mobile communications standard supporting multiple predefined modulation alphabets wherein the received signal comprises first data transmitted by a transmitter to the receiver circuit and second data transmitted by a transmitter to another, different receiver circuit, and wherein the second data interferes with the first data, the receiver circuit comprising:
a first unit configured to determine a modulation alphabet of the multiple predefined modulation alphabets during an operation of the receiver circuit; and
a second unit configured to detect the second data at the receiver circuit on the basis of the determined modulation alphabet from the first unit.

* * * * *